United States Patent
Gabbai (10) Patent No.: US 9,230,447 B2
(45) Date of Patent: Jan. 5, 2016

(54) METHOD OF RECORDING A MOTION FOR ROBOTIC PLAYBACK

(76) Inventor: Yaron Gabbai, San Diego, CA (US)

(*) Notice: Subject to any disclaimer, the term of this patent is extended or adjusted under 35 U.S.C. 154(b) by 0 days.

(21) Appl. No.: 13/603,371

(22) Filed: Sep. 4, 2012

(65) Prior Publication Data

US 2014/0065586 A1 Mar. 6, 2014

(51) Int. Cl.
*G09B 19/00* (2006.01)

(52) U.S. Cl.
CPC ............ *G09B 19/00* (2013.01); *G09B 19/0038* (2013.01)

(58) Field of Classification Search
CPC .............................. G09B 19/00; G09B 19/0038
USPC ................... 434/247, 249, 250, 252, 256, 258
See application file for complete search history.

(56) References Cited

U.S. PATENT DOCUMENTS

| | | | | |
|---|---|---|---|---|
| 5,554,033 A | * | 9/1996 | Bizzi et al. | 434/247 |
| 5,647,747 A | * | 7/1997 | Macri et al. | 434/247 |
| 5,694,340 A | * | 12/1997 | Kim | A63B 24/0006 434/252 |
| 5,823,878 A | * | 10/1998 | Welch | A63B 69/36 463/43 |
| 6,277,030 B1 | * | 8/2001 | Baynton et al. | 473/219 |
| 7,018,211 B1 | * | 3/2006 | Birkholzer et al. | 434/257 |
| 7,499,828 B2 | | 3/2009 | Barton et al. | |
| 7,597,017 B2 | * | 10/2009 | Bedard et al. | 73/866.4 |
| 8,043,162 B2 | | 10/2011 | Sery | |
| 2005/0215335 A1 | | 9/2005 | Marquardt | |
| 2006/0166738 A1 | * | 7/2006 | Eyestone | A63B 15/005 463/36 |
| 2009/0176592 A1 | | 7/2009 | Sery | |
| 2013/0280683 A1 | * | 10/2013 | Smith et al. | 434/247 |
| 2013/0331195 A1 | * | 12/2013 | Sery | 473/223 |
| 2014/0018181 A1 | * | 1/2014 | Blake | A63B 24/0006 473/277 |

OTHER PUBLICATIONS

Seifert, Kurt and Camacho, Oscar. "Implementing Positioning Algorithms Using Accelerometers" AN3397, Freescale Semiconductor. Feb. 2007. http://www.freescale.com/files/sensors/doc/app_note/AN3397.pdf.*

* cited by examiner

*Primary Examiner* — Sam Yao
*Assistant Examiner* — Michael Humphrey
(74) *Attorney, Agent, or Firm* — Mark Wisnosky (57) ABSTRACT

A method of recording the motion of a physical object moved under human control is described that allows repeated replay of the exact motion using a robot to cause the motion of the object to occur in such a way as to allow a human student to interact with the object and experience the fundamental movements required to reproduce the motion consistently, thereby enhancing motor learning.

9 Claims, 11 Drawing Sheets

Acceleration from Trapezoidal Velocity
Approximation

Acceleration Triangular
Approximation

Figure 7

Velocity from Triangular
Accleration Approximation

Position from Triangular
Acceleration
Approximation

Figure 8

METHOD OF RECORDING A MOTION FOR ROBOTIC PLAYBACK

RELATED APPLICATIONS

Not applicable.

TECHNICAL FIELD

The present invention relates to a method of recording the motion of a physical object moved under human control and then allowing repeated replay of the exact or a perfected version of the motion using a robot to cause the motion of the object to occur in such a way as to allow a human student to interact with the object and experience the fundamental movements required to reproduce the motion consistently, thereby enhancing motor learning.

RELATED BACKGROUND ART

Methods and apparatuses have been developed to allow the acquisition of data related to the motion of physical objects under the control of a human subject for the purpose of providing feedback on the performance of the subject in executing the motion in order to enhance training. Objects such as golf clubs, baseball bats and tennis rackets have been outfitted with sensors such as strain gauges, gyroscopes, magnetometers, lasers and accelerometers that provide temporal signals related to the position of the object in order to quantify certain aspects of the performance of swinging the object by a student. The feedback is typically presented as aural or tactile signals that are provided during the swing to signal either proper or improper technique.

Methods have been developed for the programming of industrial robots to execute complex tasks by recording the movements of human operators in performing the desired tasks and translating the recorded motions to a format that can be directly executed by the robot. In these cases, the objective is for the robot to autonomously perform the task essentially free of any human involvement and with higher efficiency than a human operator. Thus, these industrial robots typically operate outside the limitations of human constraints, employing forces or ranges of motion that could severely injure a human.

It is well recognized that the learning of complex motor skills in humans is enhanced by directly stimulating what is termed "muscle memory", otherwise known as motor learning. When a movement is repeated over time, a long-term muscle memory is created for that task that eventually allows it to be performed without conscious effort. This process decreases the need for attention, enables the student to accurately repeat the motion even when under pressure to perform, and creates maximum efficiency within the motor and memory systems. Examples of muscle memory are found in everyday activities that become automatic and improve with practice, such as riding a bicycle, typing on a keyboard, playing a musical instrument, hitting a baseball or swinging a golf club. One way to accelerate motor learning is to cause the limbs of a student to repeatedly trace a desired motion as established by a competent instructor without otherwise interfering with the student's environment. Thus, for example, an industrial robot could be programmed to repeatedly swing a baseball bat or a golf club in a trajectory provided by an instructor and in such a way as to allow the student to naturally and comfortably grip the bat or club while maintaining a normal stance.

Although a competent instructor could conceivably enter swing trajectory information in parametric form into a motion control computer to provide the basis for the robot movement, it is much more natural and efficient to record the temporal parameters of the swing trajectory as performed either by the instructor or the student using a suitably instrumented appliance, then translate those parameters into robot motion control instructions while ensuring careful processing of the recorded data to avoid unintentional motion that could cause injury to the student. Thus, there is a need for a method for acquiring and processing swing trajectory data and translating it to motion control instructions for a suitably designed robot to smoothly replicate the instructor's swing for the student to experience safely.

DISCLOSURE OF THE INVENTION

The invention provides a method for acquiring and storing temporal data describing the motion of a suitably instrumented physical object under the control of a human operator, then processing the data to develop motion control instructions for an appropriately designed industrial robot to replicate the motion while allowing unconstrained access to the object by a human operator. In one embodiment the motion control commands of the motion-generating device are generated using a limited data set derived from a digitized motion by the user. The reason for using limited data sets is that digitized motion of the users golf swing will include inconsistency in the motion. Acceleration of the human's motion has been found by the inventors to typically not be smooth. This results in a jerkiness to the motion that is detrimental to muscle memory learning. Smoothing of the data can help however with the technique described below a perfectly smooth acceleration can be programmed into the motion-control device while still maintaining the fundamental characteristics of the motion to be learned through repetition. In one embodiment the limited data set includes the extreme points of the motion, the maximum speed reached during the motion and the timing of the motion. The invention will be described using a golf club as an example of a physical object, the motion of which proscribes a swing of the club for the putting or chipping of a golf ball. However, it will be understood by one skilled in the art that a similar approach with different hardware applies to other swings in golf, or to swinging a bat to hit a baseball.

DETAILED DESCRIPTION

Figure 1:
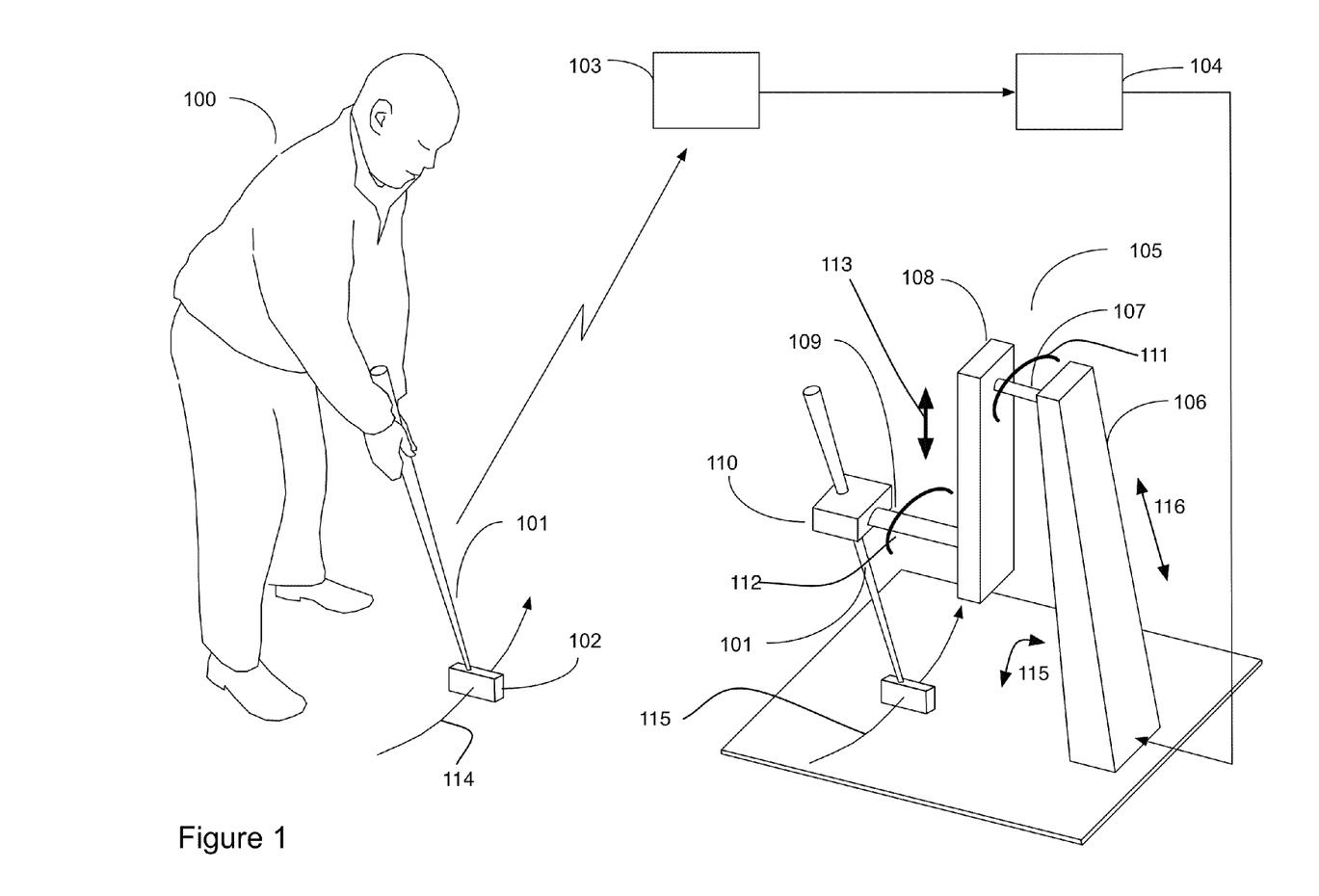
FIG. 1 shows a diagram of the training system in which the inventive method is practiced.

FIG. 1 shows a diagram of the training system within which the inventive method is practiced. An operator 100, who may be either an instructor or a trainee, takes one or more training strokes with a putter 101 which is instrumented with electromechanical sensors to sense the 3-dimensional position of the head of the club 102 at specific timing increments. The positional signals from the sensors are uploaded (wirelessly, in this example) to a signal processing unit 103 where they are digitized and stored for subsequent signal processing. The signals from the training strokes are combined and further processed to generate motion control instructions that are applied to a motion controller 104 which causes a motion-generating device 105 to replicate the training stroke. The motion-generating device in this example is a specially constructed robot having an adjustable primary support beam 106 that supports a motor driven rotary shaft 107 termed the motion pendulum axis. Support beam 106 can be extended 116 to center the motion pendulum axis at the desired height. Shaft 107 is fixed to secondary beam 108 which supports a second motor driven rotary shaft 109 termed the stroke launch axis which is fixed to a clamp 110 which is arranged to support putter 101. Support beam 106 can also be tilted 117 to ensure that the putting arc 115 is in the desired putting stroke plane. Shaft 109 is also capable of linearly translating 113, termed the stroke upswing axis, with respect to shaft 107 which allows a linear lifting motion to be applied to the putter during the stroke 114 (lifting motion not visible) in addition to the rotations 111, 112 about shafts 107 and 109. The lifting motion 113 is coordinated with the rotation of shaft 112 and pendulum motion 111 and results in a stroke that causes the golf ball to roll so that it more accurately follows the intended path. Prior art models of golf strokes typically model the golf swing as a dual pendulum motion. The natural motion 114 of the golfer 100 is recorded and replayed by controlled simultaneous rotation motion 111 about shaft 107, rotation motion 112 about shaft 109 and linear motion 113 along beam 108. In this embodiment, the coordinate system for the stroke of the golf is defined in terms of the stroke pendulum axis, the stroke launch axis and the stroke upswing axis along with the constraints of orientation of the motion-generating device discussed below.

Figure 2:
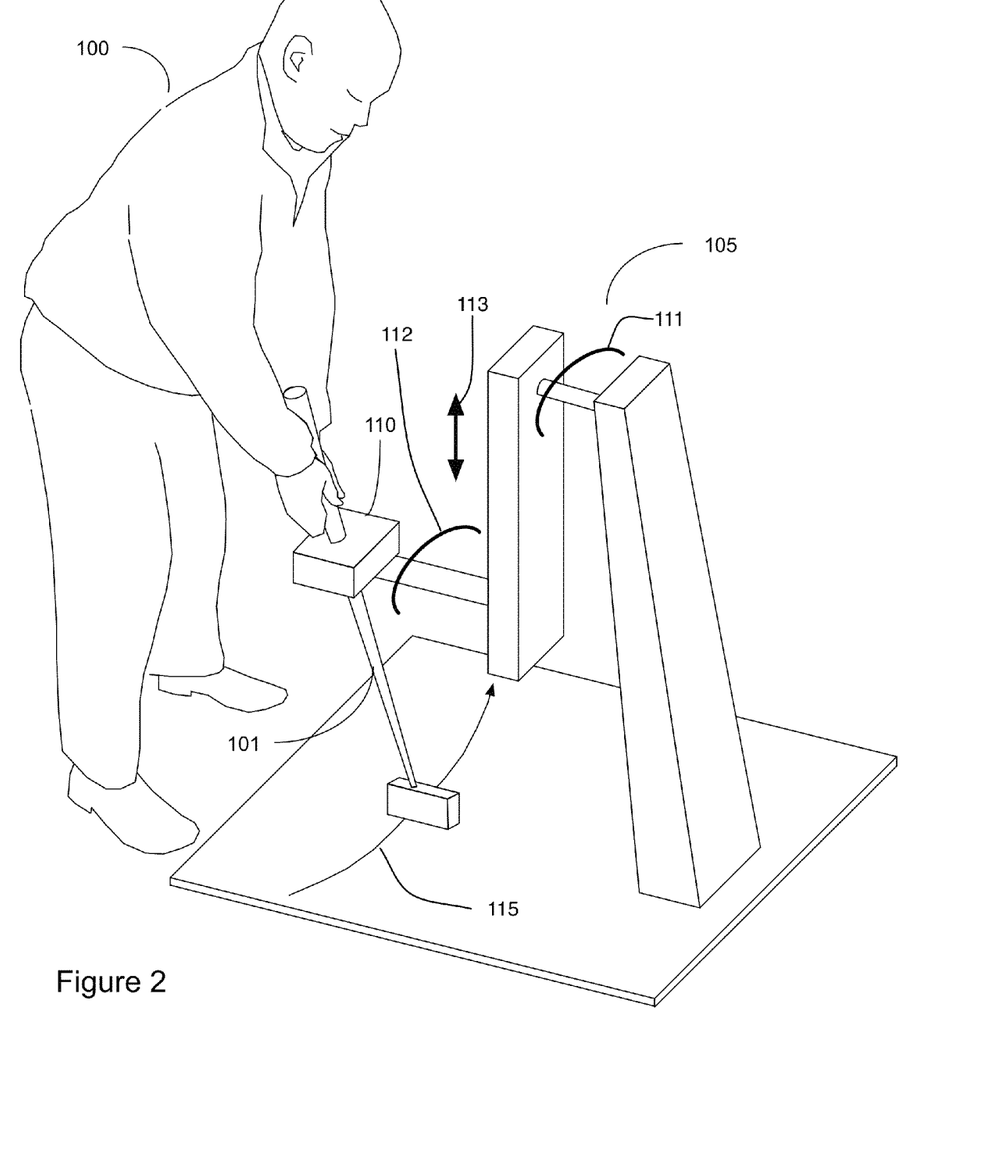
FIG. 2 shows a student interacting with the robotic playback unit.

FIG. 2 shows a trainee 100 positioned at the motion-generating device 105. Clamp 110 is arranged to allow the trainee 100 to grasp the putter 101 in a normal and natural stance. In one embodiment as an alternative to that shown in FIG. 1, the trainee records his natural golf motion by swinging the club 101 while it is clamped 110 in the device 105. Sensors within the device 105 record the motion for processing and playback. Once recorded the motion is processed and the motion-generating device 105 swings the club while the trainee repeatedly experiences the movement associated with the stroke.

In one embodiment processing includes a change of coordinates from the three dimensional measurements made using an instrumented golf club as shown and described in FIG. 1 to a coordinate system described by the stroke pendulum axis 111, the stroke launch axis 112 and the stroke upswing axis 113. The club motion is measured in Cartesian coordinates relative to the initial ball position and is transformed to a motion in the coordinates of the stroke pendulum axis 111, the stroke launch axis 112 and the stroke upswing axis 113. The motion in the original Cartesian coordinates is transformed to two rotary motions around axes 111 and 112 and a linear motion along upswing axis 113. In one embodiment the stroke pendulum axis 111, the stroke launch axis 112 and the stroke upswing axis 113 are each driven by separate servo-motors within the motion-generating device and the coordinates along these three axis are signal amplitudes applied to the three independent servomotors to drive the separate parts of the device as already described.

Figure 2A:
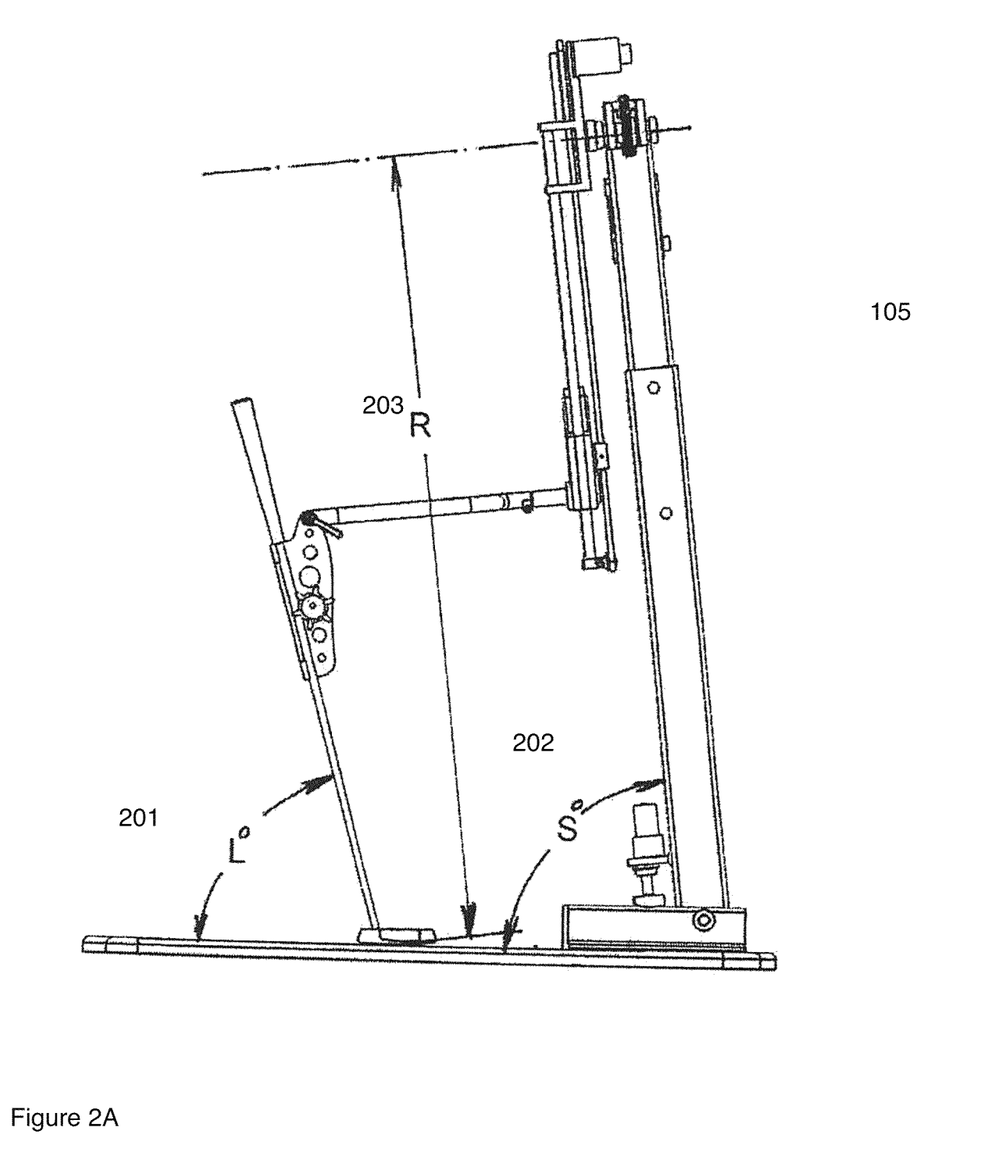
FIG. 2A shows a side view of the robotic playback unit with some indicated parameters.

FIG. 2A shows three additional constraining dimension parameters used in setting up the motion-generating device 105. The swing plane angle 202, the swing radius 203 and the lie angle 201 are measured and set for each user. In the preferred mode the angles 201 and 202 are fixed during the swing motion of the club. The starting swing radius 203 defines a zero point for the linear motion along upswing axis 113 and adjusts so that the putter is positioned in the correct lie angle 201 and the putter head 102 lies on the floor. The swing radius changes as the golfer lifts the putter and places topspin on the golf ball when struck. The motion of the golfer and the golf club in playback is defined by motion in a coordinate system described by the rotations 111, 112 and the linear motion 113. The coordinate system of the motion-generating device is constrained by these constraining dimension parameters of the swing plane angle, swing radius and the lie angle as shown.

Figure 2B:
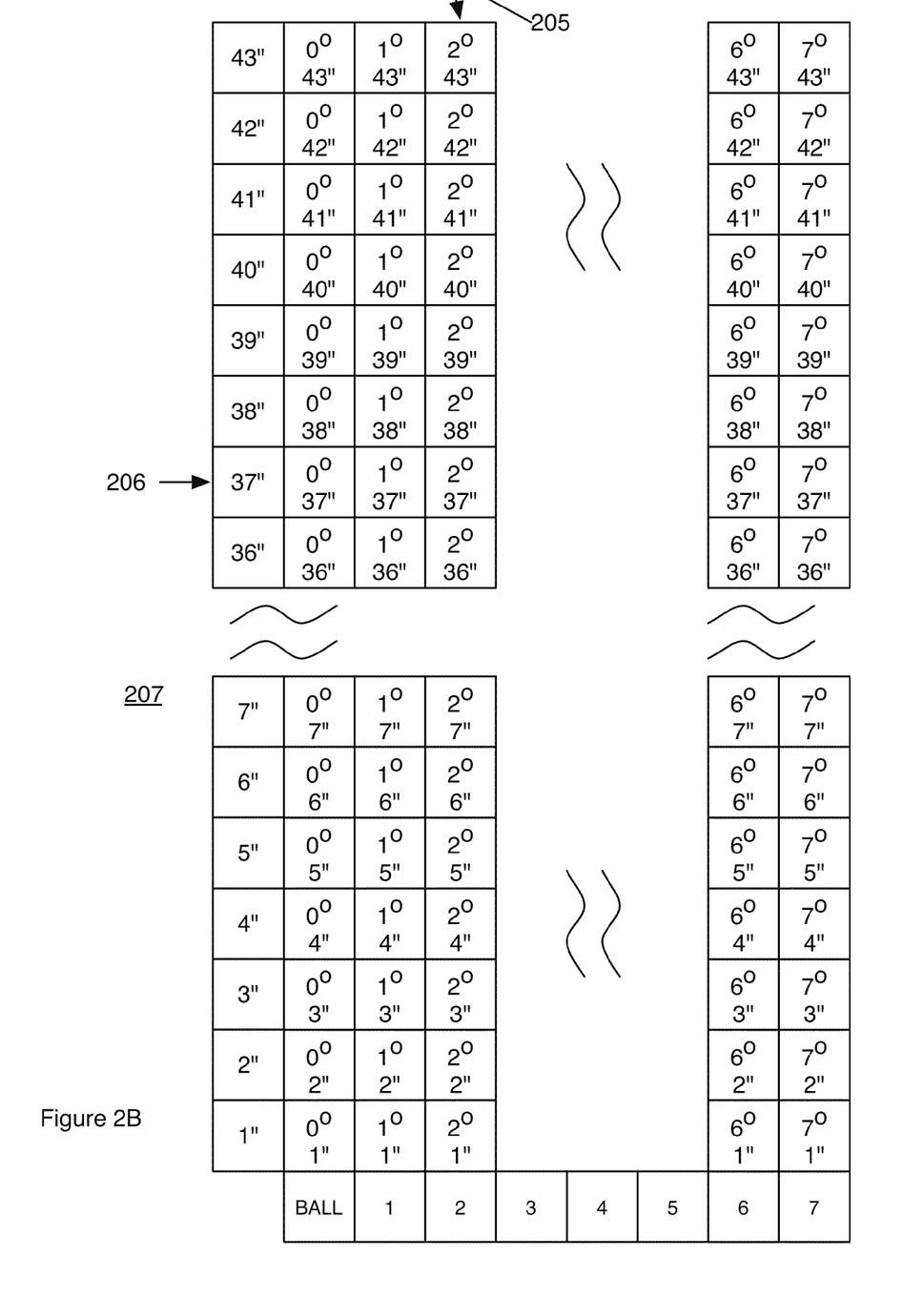
FIG. 2B shows a wall chart measurement device used to set parameters for the playback unit.
Figure 2C:
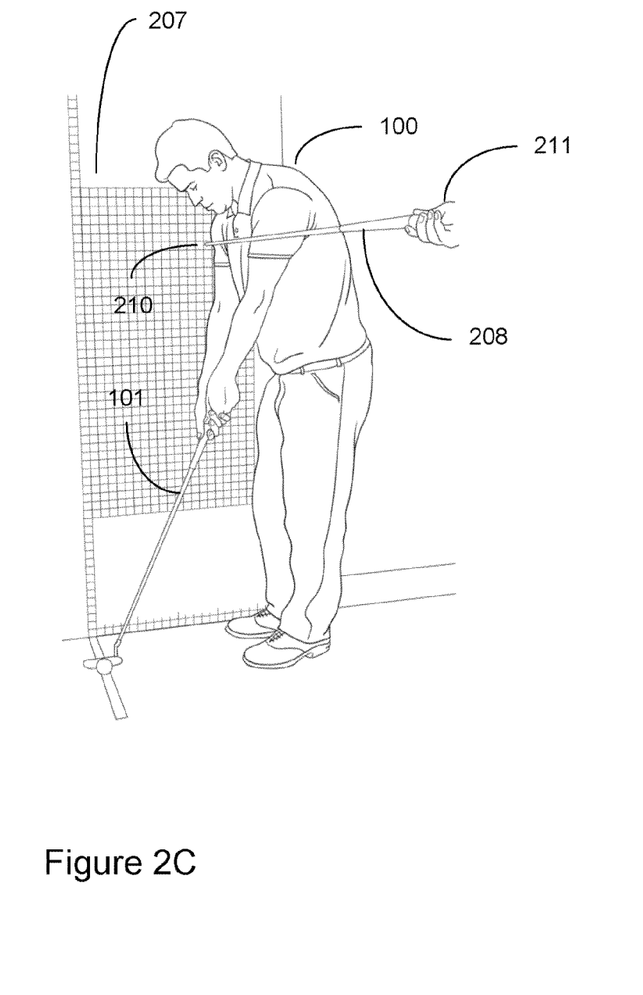
FIG. 2C shows use of the wall chart measurement device of FIG. 2B.

FIG. 2B shows a wall chart 207 used to measure the constraining dimensions of swing plane angle, swing radius, putter length and lie angle. The chart comprises columns 205 and rows 206 that provide a step-wise map of the swing radius and the swing plane angle. FIG. 2C depicts use of the chart for making the measurements of the described parameters. The golfer 100 stands in front of the chart 207 as shown holding the golf club 101 as he would to normally address the golf ball to be struck in a direction perpendicular to the wall upon which the chart is placed. Another party 211 uses either a pointer 208 or a laser pointer (not shown) to measure the projection of the golf club shaft on the chart 209 to measure the putter length and the lie angle and to measure 210 the location of a line just below the golfer's collarbone to determine the values for the swing radius and swing plane angle. The system in the exemplary putting trainer uses the measured three dimensional motions of the golfer as described in FIGS. 1 and 2 along with the measurements as shown in FIGS. 2B and 2C to set up the motion-generating device specific to the user and replicate that users recorded motions. In another embodiment, not shown, the measurement of the swing radius, swing plane angle and lie angle is accomplished by making measurements on photographs or video recordings of the golfer/trainee while putting a golf ball. In this way all parameters required to record and setup a motion-generating device may be made by observation of a golfer making putts on the golf course. In this manner the parameters from successful putts can be identified and separated from those from unsuccessful putts to improve selection of the stance and motions to be repeated and learned.

Figure 3:
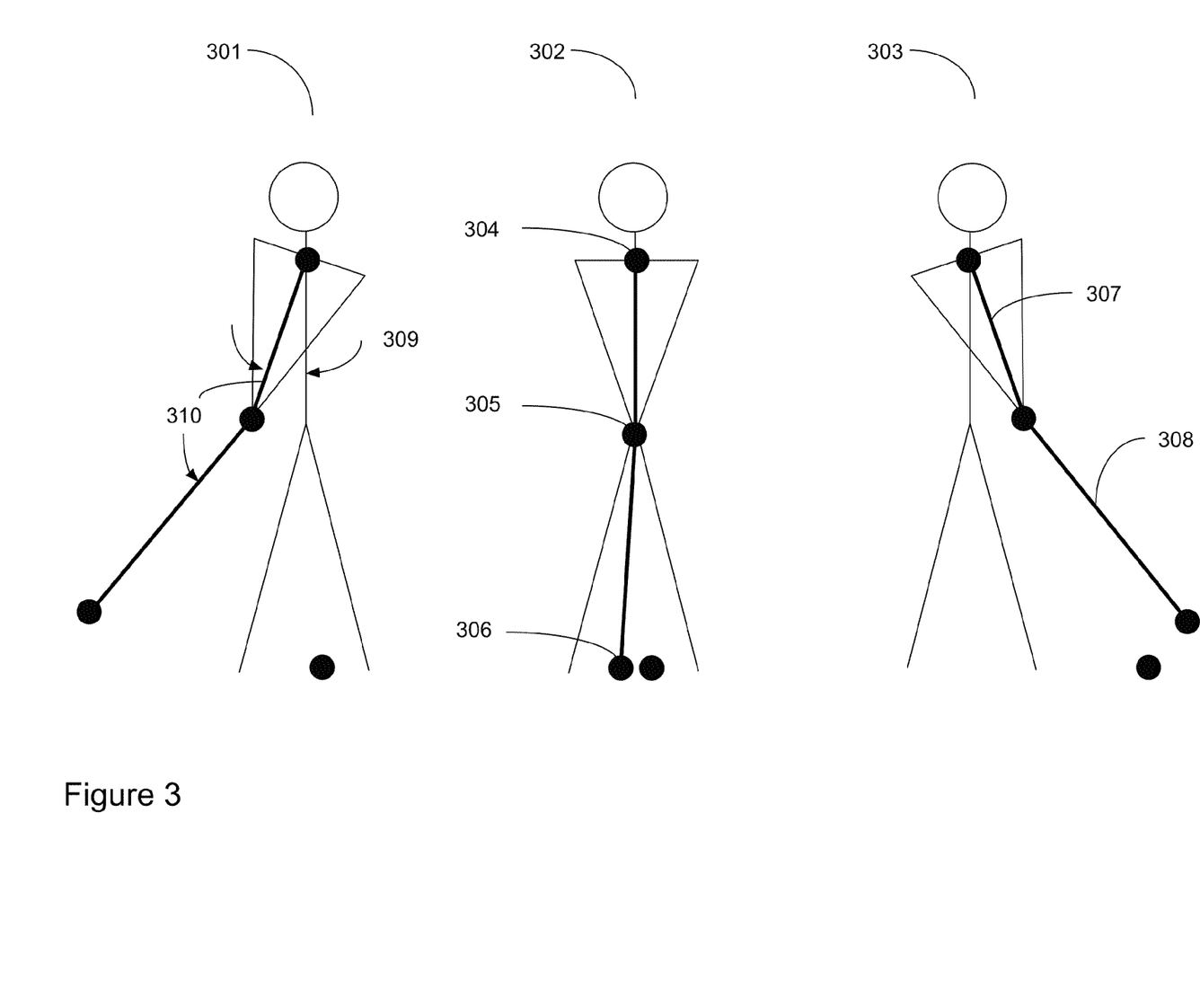
FIG. 3 shows an enhanced dual pendulum model applied to a putting stroke.

FIG. 3 shows an embodiment in which the dual motions of stroke pendulum axis 111 and the stroke launch axis 112 form the basis for a basic stroke. The stick-figures illustrate the back swing 301, and the ball contact 302 and follow-thru 303 phases of forward swing of the stroke. Rotational shaft 107 generates the rotational motion 111 (stroke pendulum axis) of the arms, shoulders and back having an effective length 307 and a rotation angle 309 through primary pivot 304. The linear translation 113 of shaft 109 with respect to shaft 107 changes the effective length 307 and allows the robot to introduce "rise" into the stroke (stroke upswing axis). Rotational shaft 109 generates the rotational motion 112 through the secondary pivot associated with the wrists 305 having a length equal to the club length 308 and described by the "wrist-cock" angle 310 (stroke launch axis). The parameters of the lie angle, swing plane angle and swing radius along with the stroke pendulum, stroke launch and stroke upswing motions define the golfers swing motion.

Figure 4:
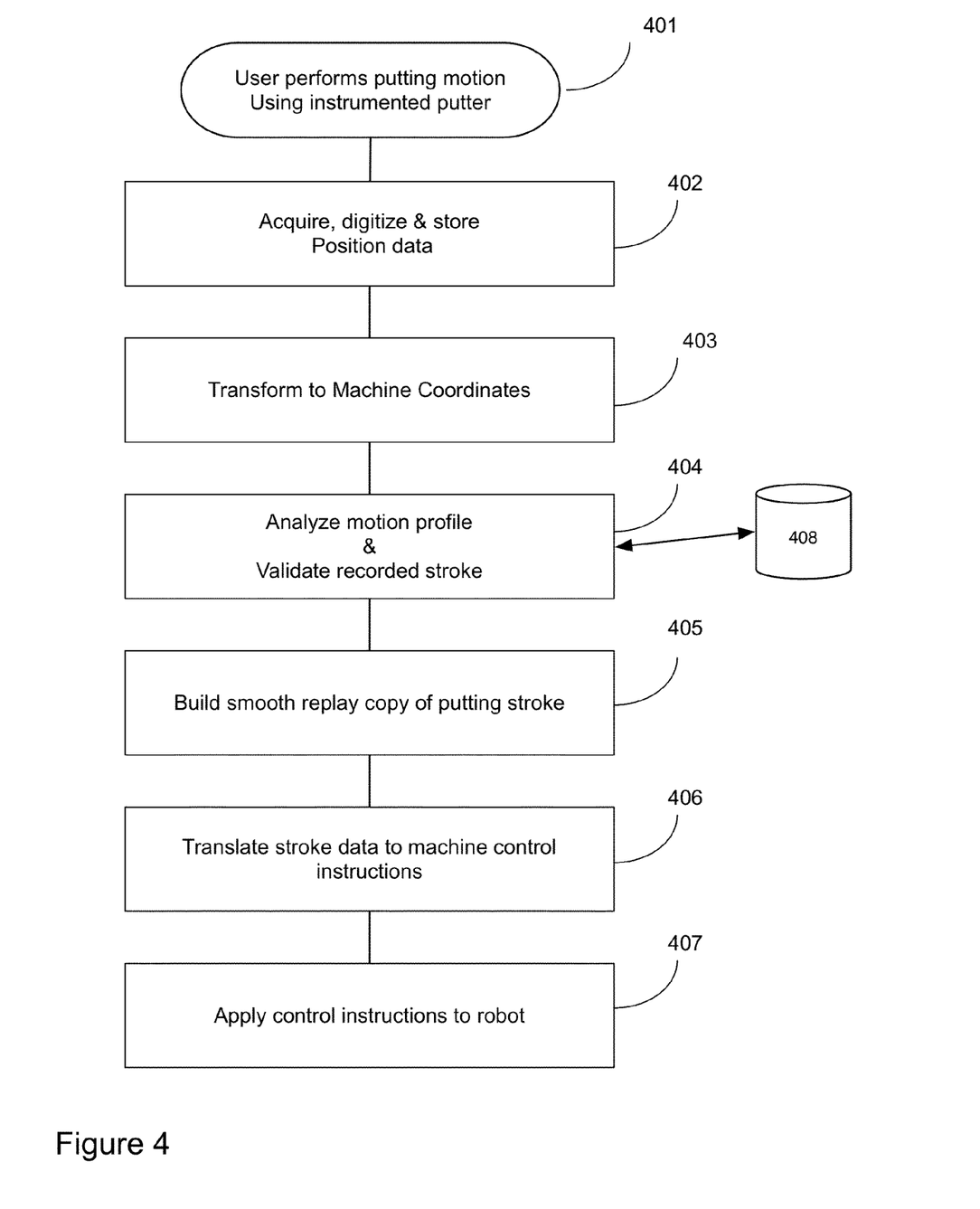
FIG. 4 shows a flowchart of the inventive method.

FIG. 4 is a flow chart showing the sequential elements of the inventive method. The method begins 401 with a user performing a putting motion using an instrumented putter that senses the 3-dimensional position of the club head at predetermined intervals and transmits this time-based positional information to a signal processor unit 103. The signal processor unit 103 acquires and filters the positional information to remove noise, then digitizes and stores the filtered positional information corresponding to the putting motion 402. In one embodiment the instrumentation of the golf club is through clamping the club in a motion-generating device and using sensors built into the motion-generating device. In another embodiment the instrumentation of the golf club is done through measurement devices such as accelerometers and other position sensing devices affixed to the club. In the golf embodiment, the initial measurements 401 also include both the sequential 3-dimensional measurement of the club position through the stroke as well as the setup parameters of the lie angle, swing plane and swing radius. The measurements are then transformed to a coordinate system specific to the motion-generating device. A preliminary analysis 404 of the motion is performed to verify that the recorded stroke corresponds to a valid training motion. This preliminary analysis comprises evaluating the extreme positions and velocities of the club head during the motion and comparing these extreme values to limit values established previously and stored 407 in the signal processor unit 103. In another embodiment preliminary analysis further includes separating successful golf strokes from unsuccessful golf strokes. If the motion is validated, the stored putting motion data is used to construct a smoothed copy of the putting stroke 404 data that is translated into machine control instructions 405. In one embodiment the translation uses a limited set of data from the digitized signal. In a golf embodiment the limited data includes the extreme position locations of the golf club during the swing, the maximum speed of the club head during the swing motion and the timing of the swing motion. The machine control instructions are then applied 406 to a machine controller 104 which controls the motion of the robot 105. In another embodiment the control instructions are generated using all of the digitized data and the users motion is smoothed to create the control instructions. In the preferred embodiment the limited data is used and the motion control commands are generated using smooth accelerations while maintaining the limited data set characteristics of the stroke. The reason for using limited data sets is that digitized motion of the users golf swing will include inconsistency in the motion. Acceleration of the human's motion has been found by the inventors to typically not be smooth. This results in a jerkiness to the motion that is detrimental to muscle memory learning. Smoothing of the data can help however with the technique described below a perfectly smooth acceleration can be programmed into the motion-control device while still maintaining the fundamental characteristics of the stroke to be learned through repetition.

Figure 5:
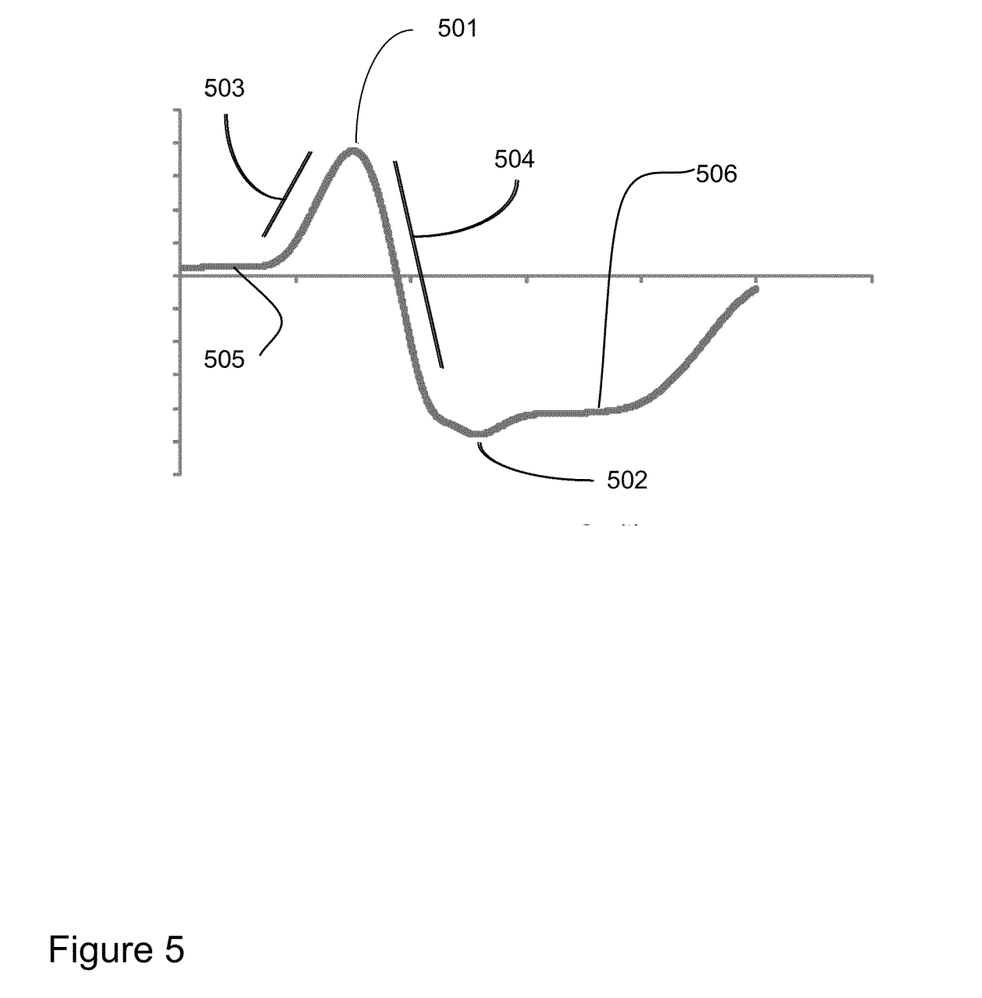
FIG. 5 shows a typical x-axis position record.

FIGS. 5 through 8 illustrate a nonlimiting example of the formation of the smoothed putting stroke machine control instruction data. FIG. 5 shows a typical record of the position of a putter club head during a putting stroke. The horizontal axis is time and the vertical axis is displacement of the club head in terms of the machine defined coordinate stroke pendulum axis. Similar records exist for other coordinate axis of the club head. The stroke pendulum axis defines the position of the club head during rotation 111 about the axis 107. The slope of the graph therefore corresponds to the velocity of the club head. The zero point on the vertical axis corresponds to the position where the club face hits the ball. The extreme position 501 and velocity 503 of the back swing and the extreme position 502 and velocity 504 of the forward swing are evaluated to validate the motion of the putting stroke. Historical data of these parameters are used to define acceptable ranges for the values. Single point outlying data may be removed by averaging with values for nearest neighbor points. Multiple point outlying in a dataset results in deletion of the data set. The origin of the x-axis is adjusted to be the club head position at address and the record is truncated to remove extraneous data prior to the back swing and after the forward swing. This results in truncated position data. The algorithm to define the control commands for the motion control device selects the values of the motion extremes 501, 502, the maximum speeds of 503 504 and the timing or location along the horizontal axis where these data points of the swing are located. The remaining step then create a smooth curve that best includes these points while eliminating the very small velocity/acceleration variations inherent in a human's swing.

Figure 6:
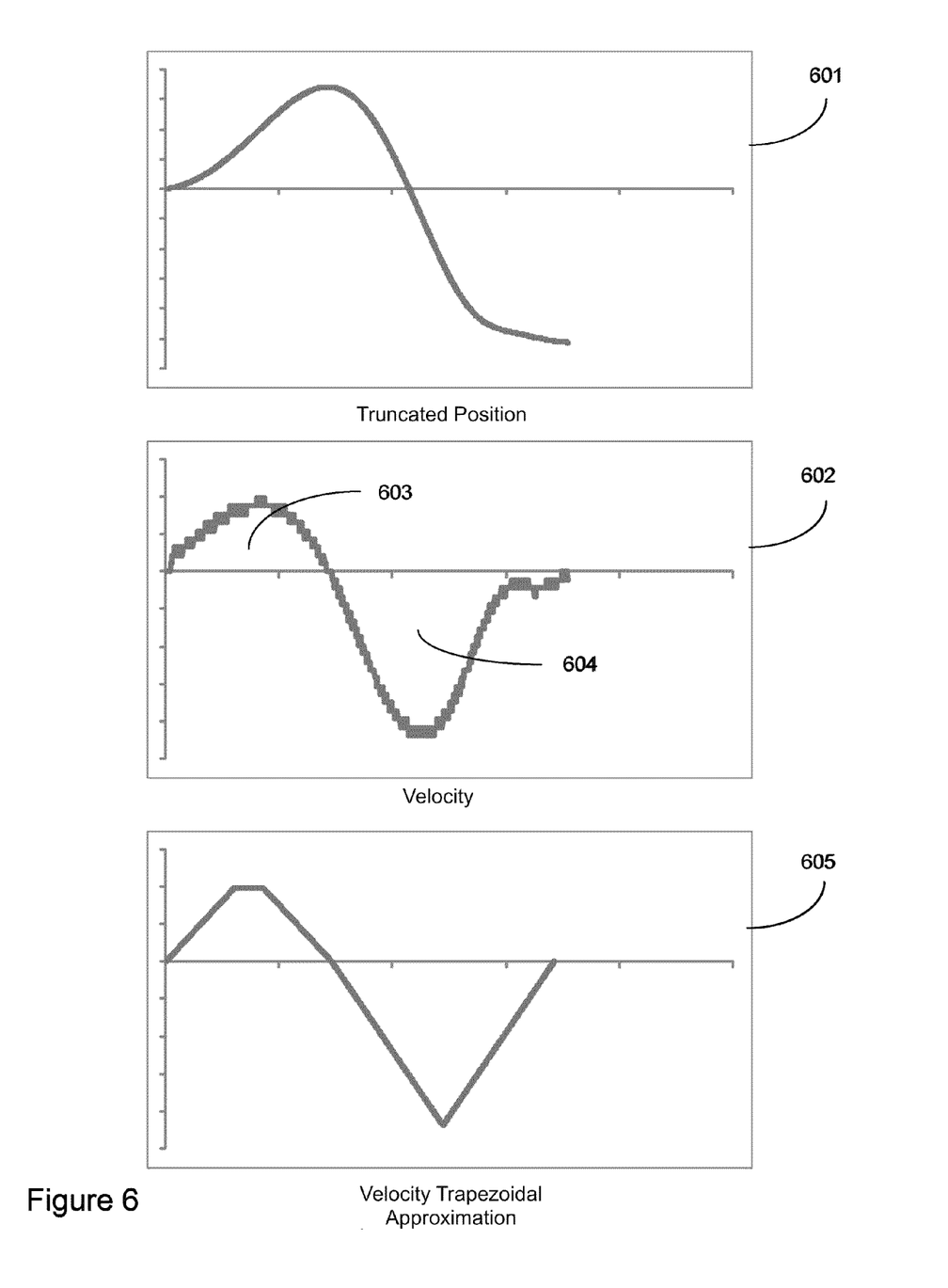
FIG. 6 shows the truncated x-axis position data, calculated velocity and the trapezoidal velocity approximation.

The data is truncated to remove points outside of the range of interest. Points 505 at the beginning of the stroke before the backstroke and at the end of the stroke 506 after the ball has been struck are removed. FIG. 6 shows the truncated position data record 601. The data are also shifted such that the beginning of the putting stroke is at the origin (0,0) position. The velocity record 602 is obtained by numerically differentiating the position data 601. The objective of subsequent signal processing is to generate position, velocity and acceleration data records that are free of discontinuities and variabilities of the human stroke while still maintaining the characteristics in terms of positions, timing and velocities of the human stroke. The signal processing produces motion control commands that are amenable to safely controlling the position, velocity and acceleration of robotic elements. The next step in the signal processing sequence is to form a trapezoidal approximation 605 to the velocity record 602. This is accomplished by forming separate symmetrical trapezoidal approximations to the velocity in the back swing region 603 and forward swing region 604 of velocity record 602. Furthermore, in order to maintain an accurate position data record and to ensure that the top velocity in playback is the same as the recorded stroke, the areas under each of the regions 603, 604 is maintained.

Figure 7:
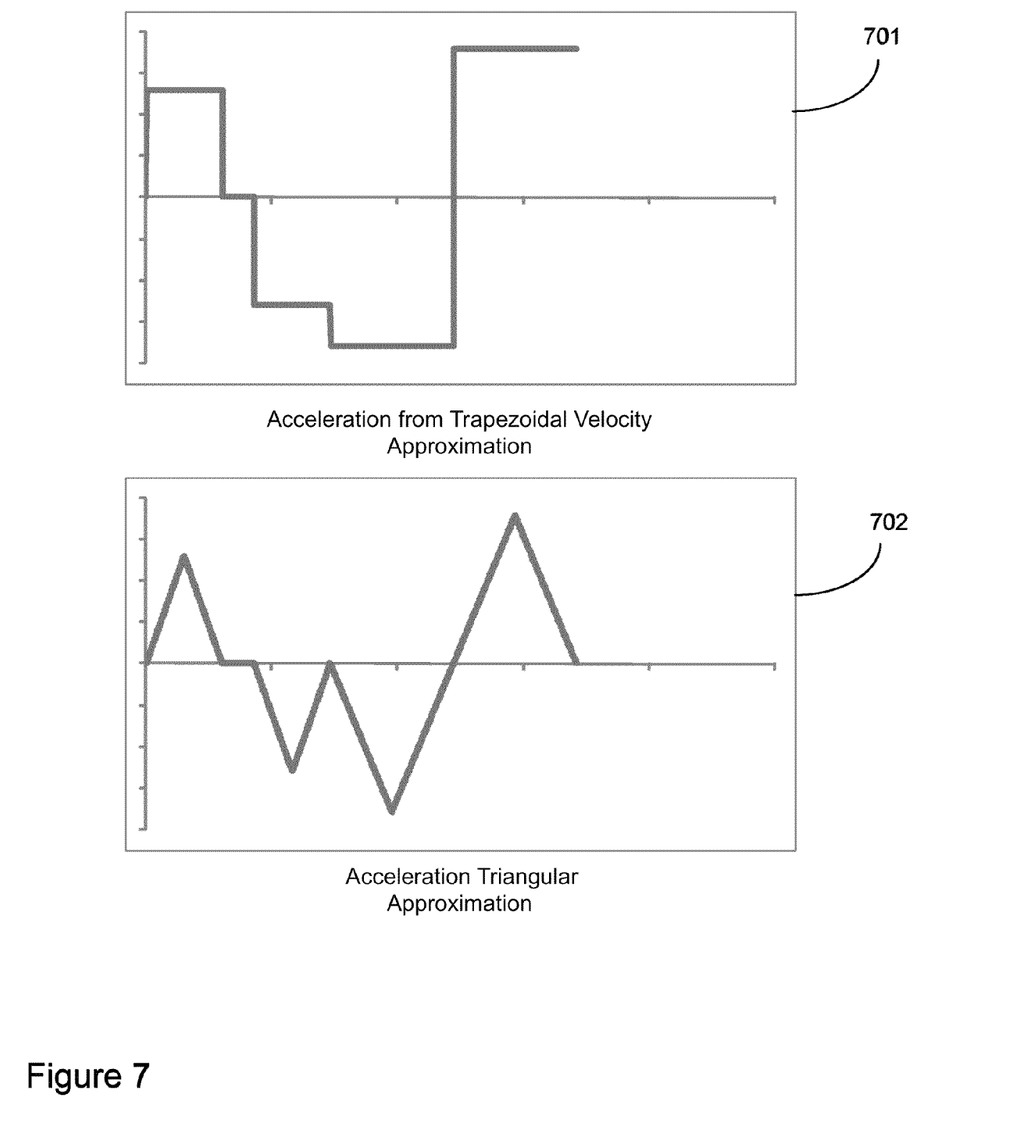
FIG. 7 shows the x-axis position and acceleration data derived from the trapezoidal velocity approximation, and the triangular acceleration approximation.

The next step in the signal processing sequence is to develop a smooth approximation to the acceleration record associated with position record 601. This begins by differentiating the trapezoidal velocity record 605 to form a rectangular acceleration record 701 as shown in FIG. 7. However, the resulting discontinuities in the acceleration could result in undesirable robot control transients causing jerky motion. Therefore, a triangular acceleration approximation 702 is derived from the rectangular approximation 701 with the constraint of equal regional areas again imposed in order to preserve velocity extremes. The acceleration is thereby constrained to continuous values.

Figure 8:
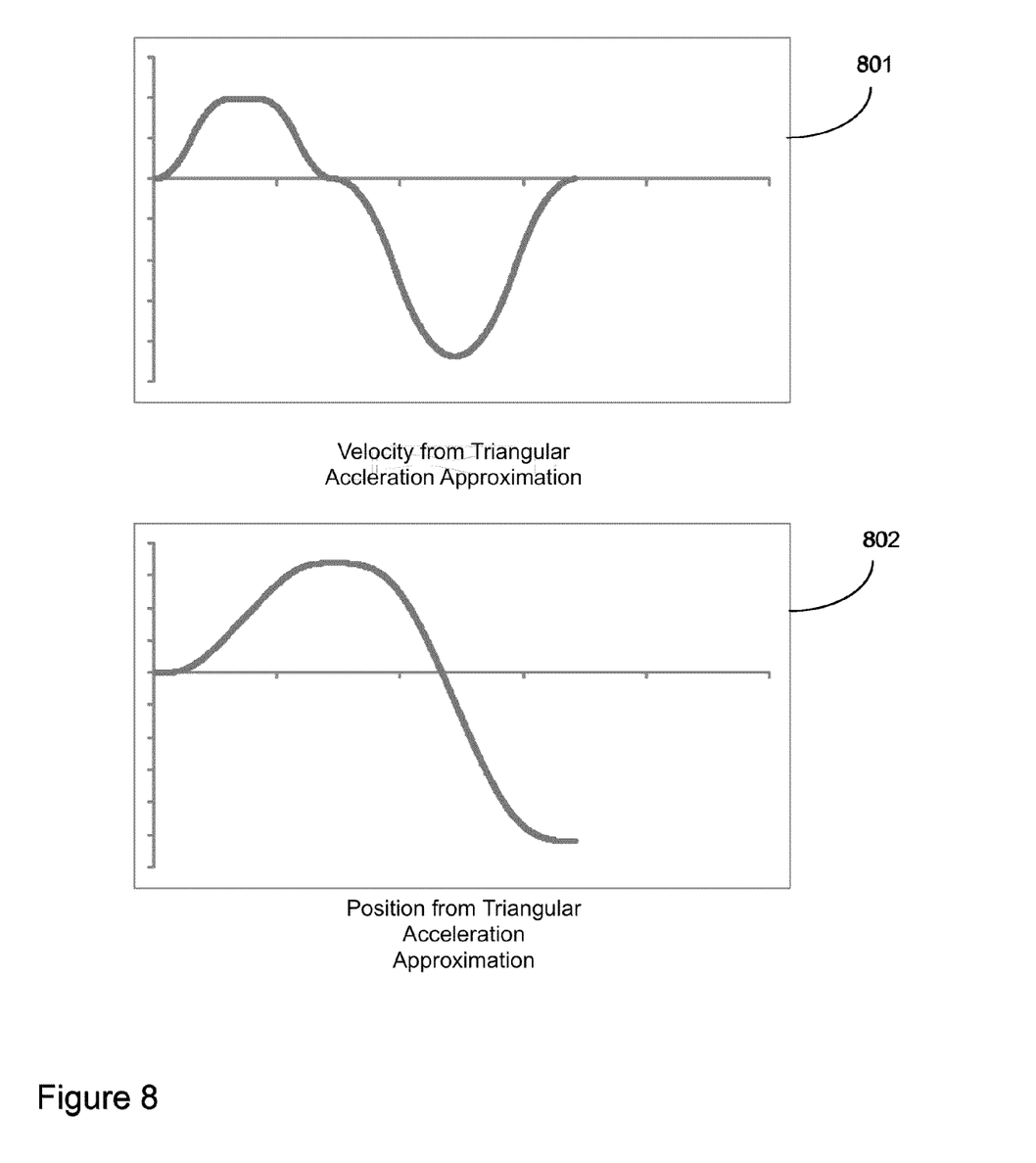
FIG. 8 shows the x-axis velocity and position data derived from the triangular acceleration approximation.

Triangular approximation 702 can now be numerically integrated to form the smoothed velocity 801 and position 802 records shown in FIG. 8. These records are completely free of any troublesome discontinuities that could cause jerky motion, but exhibit the same peak values found in the original data records. Thus, data records 702, 801 and 802 are adequately conditioned to apply to the motion controller 104 driving the robot, resulting in a constrained, but faithful reproduction of the original putting motion. Identical processes are executed on the position data records for all of the defined machine coordinates of the recorded motions to form complete 3-dimensional data records describing club head motion. The position, velocity and acceleration records derived as described through FIGS. 5-8 then provide the motion control commands related to position, velocity, acceleration and timing to drive the motion-control device to replay the recorded stroke motion. The motion control commands along with the measured settings of the swing plane 202, the swing radius 203 and the lie angle 201 allow replay of a golf stroke customized to an individual user.

The machine and the recording, analysis and processing has been described in terms of a robotic system applicable to a golf swing but those skilled in the art can readily see that an analogous system could be applied to many other sport motions: the swing of a bat, the swing of a racket, the toss of a ball, etc.

A method of recording the motion of a physical object moved under human control is described that allows repeated replay of the exact motion using a robot to cause the motion of the object to occur in such a way as to allow a human student to interact with the object constrained by the robot and experience the fundamental movements required to reproduce the motion consistently, thereby enhancing motor learning.

I claim:

1. A method of recording a motion of a physical object executed by a human operator and robotically repeating the motion on a motion-generating device to enhance motor learning of a trainee by repetition of said motion comprising:
   a) instrumenting said physical object with electromechanical sensors that sense a 3-dimensional position of the object at sequential instants of time during said motion and provide electronic positional signals during said motion,
   b) acquiring the electronic positional signals from the sensors during said motion of said physical object over at least one training trajectory by said operator and storing the positional signals in a data format that allows for subsequent signal processing,
   c) verifying that the stored positional data corresponds to a valid training trajectory by comparison with previously established limits,
   d) transferring the stored positional data for each training trajectory to a signal processor and processing the data to form a motion data record in a coordinate system particular to a motion-generating device,
   e) constructing motion control commands that include time, 3-dimensional acceleration, velocity and position data in a coordinate system particular to the motion-generating device based on the motion data record, wherein constructing the motion control commands include selecting for each motion data record in the coordinate system particular to the motion-generating device, a maximum excursion, a minimum excursion, a maximum velocity, a minimum velocity, a maximum acceleration and a minimum acceleration and a time and a position of occurrence during the motion data record for each of the maxima and minima in excursion, velocity and acceleration and constructing a new data set of position, velocity and acceleration values that maintains the time and position of occurrence of the maxima and minima in excursion, velocity and acceleration and further constrains acceleration to continuous values, and,
   f) after completion of steps a) through e), attaching the physical object to the motion-generating device wherein said trainee interacts with said physical object in a normal operational manner, and
   g) applying the motion control commands to motion controllers within the motion-generating device to cause the motion-generating device to repeatedly move said physical object over said training trajectory while said trainee interacts with said physical object.

2. The method of claim 1 wherein the step of verifying the training trajectory comprises comparing positional and velocity extremes obtained from the stored positional data to predetermined limits.

3. The method of claim 1 further including measuring at least one constraining dimension of the motion-generating device and constraining the motion-generating device to the measured constraining dimension when the motion-generating device repeatedly moves the said physical object over said training trajectory.

4. The method of claim 1 wherein the 3-dimensional motion data record obtained from the signal processor comprises an acceleration vector having a triangular time profile in each dimension, and reconstructing 3-dimensional velocity data based on the triangular acceleration vector data comprises numerically integrating the acceleration data and reconstructing 3-dimensional position data based on the triangular acceleration vector data comprises numerically integrating the velocity data.

5. The method of claim 1 wherein the human operator and the trainee are the same person.

6. A method of recording a motion of a golf club executed by a human operator and robotically repeating the motion on a motion-generating device to enhance motor learning of a trainee by repetition of said motion comprising:
   a) measuring the position of the top of the golf club, the position of the shoulders of the human operator and the swing plane angle of the golf club,
   b) positioning a motion-generating device such that the position of the top of the golf club, the shoulders of the human operator and the swing plane angle are constrained to the measured positions when the golf club is attached to the motion-generating device,
   c) instrumenting said golf club with electromechanical sensors that sense a 3-dimensional position of the object at sequential instants of time during said motion and provide electronic positional signals during said motion,
   d) acquiring the electronic positional signals from the sensors during said motion of said golf club over at least one training trajectory by said operator and storing the positional signals in a data format that allows for subsequent signal processing,
   e) verifying that the stored positional data corresponds to a valid training trajectory by comparison with previously established limits,
   f) transferring the stored positional data for each training trajectory to a signal processor and processing the data to form a motion data record in a coordinate system particular to the motion-generating device,
   g) constructing motion control commands that include time, 3-dimensional acceleration, velocity and position data in a coordinate system particular to the motion-generating device based on the motion data record, wherein constructing the motion control commands include selecting for each motion data record in the coordinate system particular to the motion-generating device, a maximum excursion, a minimum excursion, a maximum velocity, a minimum velocity, a maximum acceleration and a minimum acceleration and a time and a position of occurrence during the motion data record for each of the maxima and minima in excursion, velocity and acceleration and constructing a new data set of position, velocity and acceleration values that maintains the time and position of occurrence of the maxima and minima in excursion, velocity and acceleration and further constrains acceleration to continuous values, and, h) after completion of steps a) through g) attaching the golf club to the motion-generating device wherein said trainee interacts with said golf club in a normal operational manner, and i) applying the motion control commands to motion controllers within the motion-generating device to cause the motion-generating device to repeatedly move said golf club over said training trajectory while said trainee interacts with said golf club.

7. The method of claim 6 wherein the human operator and the trainee are the same person.

8. The method of claim 6 wherein the step of verifying the training trajectory comprises comparing positional and velocity extremes obtained from the stored positional data to predetermined limits.

9. The method of claim 6 wherein the 3-dimensional motion data record obtained from the signal processor comprises an acceleration vector having a triangular time profile in each dimension, and reconstructing 3-dimensional velocity data based on the triangular acceleration vector data comprises numerically integrating the acceleration data and reconstructing 3-dimensional position data based on the triangular acceleration vector data comprises numerically integrating the velocity data.

* * * * *